(12) United States Patent
Kim

(10) Patent No.: US 8,919,298 B2
(45) Date of Patent: Dec. 30, 2014

(54) INTEGRATED HEAT MANAGEMENT SYSTEM IN VEHICLE AND HEAT MANAGEMENT METHOD USING THE SAME

(75) Inventor: Daekwang Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 474 days.

(21) Appl. No.: 13/290,938

(22) Filed: Nov. 7, 2011

(65) Prior Publication Data

US 2012/0312498 A1 Dec. 13, 2012

(30) Foreign Application Priority Data

Jun. 9, 2011 (KR) .................. 10-2011-0055626

(51) Int. Cl.
| | |
|---|---|
| F01P 3/00 | (2006.01) |
| F01P 1/06 | (2006.01) |
| F02N 17/02 | (2006.01) |
| F01P 7/16 | (2006.01) |
| F16H 57/04 | (2010.01) |
| F01P 7/14 | (2006.01) |

(52) U.S. Cl.
CPC ............ F01P 7/165 (2013.01); F16H 57/0413 (2013.01); *F01P 7/14* (2013.01); *F01P 2037/02* (2013.01); *F01P 2060/045* (2013.01); *F01P 2060/08* (2013.01); *F01P 2060/16* (2013.01)
USPC ............... 123/41.29; 123/41.31; 123/142.5 R

(58) Field of Classification Search
CPC ... F01P 7/165; F01P 2060/45; F01P 2060/08; F01P 2060/04; F01P 2007/146; F01P 2037/02; F01P 7/14; F01P 2025/52; F01P 2060/18; B60H 1/00314; B60H 1/00878; B60H 1/025; F01N 2240/02; F02N 19/10
USPC ............ 123/41.29, 41.33, 41.1, 41.08, 41.31, 123/196 AB, 142.5 R; 73/114.68
See application file for complete search history.

(56) References Cited

U.S. PATENT DOCUMENTS

| | | | |
|---|---|---|---|
| 6,520,136 B2 * | 2/2003 | Ito et al. ................. | 123/142.5 R |
| 6,772,715 B2 * | 8/2004 | Pfeffinger et al. ......... | 123/41.31 |
| 7,069,880 B2 * | 7/2006 | Hutchins ................... | 123/41.29 |
| 7,246,487 B2 | 7/2007 | Hara | |

(Continued)

FOREIGN PATENT DOCUMENTS

| | | | |
|---|---|---|---|
| GB | 2429763 A | * | 3/2007 |
| JP | 10-071837 A | | 3/1998 |

(Continued)

*Primary Examiner* — Noah Kamen
(74) *Attorney, Agent, or Firm* — Morgan, Lewis & Bockius LLP

(57) ABSTRACT

An integrated heat management system may include an engine system circulation line around an engine and a transmission circulation line around an automatic transmission. The engine system circulation line and the transmission circulation line may be integrated by a control valve having a plurality of input and output ports. The integrated heat management system controls opening and closing of the control valve in accordance with engine cooling water temperature and automatic transmission fluid (ATF) temperature, which may be changed after engine start-up, and implements a variety of modes for varying an engine cooling water flow. Therefore, the integrated heat manage system shortens an engine warm-up time, prevents a bad effect in a low-temperature state due to a fast temperature increase of the ATF, and satisfies performance required by a vehicle of which the fuel-efficiency may be improved and the efficiency may be increased in a high oil price environment.

19 Claims, 10 Drawing Sheets

(56) References Cited

U.S. PATENT DOCUMENTS

| | | | |
|---|---|---|---|
| 7,467,605 B2* | 12/2008 | Szalony et al. | 123/142.5 R |
| 7,594,483 B2* | 9/2009 | Tsuji et al. | 123/41.1 |
| 8,205,709 B2* | 6/2012 | Gooden et al. | 123/41.31 |
| 8,409,055 B2* | 4/2013 | Gooden et al. | 165/41 |
| 8,413,434 B2* | 4/2013 | Prior et al. | 60/320 |
| 8,555,826 B2* | 10/2013 | Feldhaus et al. | 123/41.31 |
| 8,631,772 B2* | 1/2014 | Gooden et al. | 123/41.31 |
| 8,731,789 B2* | 5/2014 | Ulrey et al. | 123/142.5 R |
| 2006/0185626 A1 | 8/2006 | Allen et al. | |
| 2007/0295475 A1* | 12/2007 | Samie et al. | 165/41 |
| 2009/0101312 A1* | 4/2009 | Gooden et al. | 165/104.19 |
| 2009/0241863 A1* | 10/2009 | Kimura et al. | 123/41.1 |
| 2010/0181516 A1* | 7/2010 | Palanchon et al. | 251/324 |
| 2011/0088378 A1* | 4/2011 | Prior et al. | 60/320 |
| 2011/0120396 A1* | 5/2011 | Myers et al. | 123/41.08 |
| 2014/0144218 A1* | 5/2014 | Rollinger et al. | 73/114.68 |

FOREIGN PATENT DOCUMENTS

| | | | |
|---|---|---|---|
| JP | 2008-111414 A | | 5/2008 |
| JP | 2008-291777 A | | 12/2008 |
| JP | 2009167917 A | * | 7/2009 |
| JP | 2010-053772 A | | 3/2010 |
| JP | 2010-144801 A | | 7/2010 |
| JP | 2010-249252 A | | 11/2010 |
| WO | WO 2010/128547 A1 | | 11/2010 |

* cited by examiner

INTEGRATED HEAT MANAGEMENT SYSTEM IN VEHICLE AND HEAT MANAGEMENT METHOD USING THE SAME

CROSS-REFERENCE TO RELATED APPLICATIONS

The present application claims priority to Korean Patent Application Number 10-2011-0055626 filed Jun. 9, 2011, the entire contents of which application is incorporated herein for all purposes by this reference.

BACKGROUND OF THE INVENTION

1. Field of the Invention

The present invention relates to an integrated heat management system in a vehicle, and more particularly, to an integrated heat management system in a vehicle, which is capable of performing integrated heat management for an engine and an automatic transmission and a heat management method using the same 2. Description of Related Art In general, a heat management system applied to a vehicle is operated in such a manner as to individually control an engine and an automatic transmission in a state in which the engine and the automatic transmission are separated from each other.

FIG. 10 illustrates a general heat management system including an engine and an automatic transmission.

Referring to FIG. 10, the heat management system includes a water pump 110, a thermostat 120, a radiator 130, a cooling fan 140, and a heater core 150, which are mechanically operated except for cooling fan 140, when seen from the side of engine 100.

In particular, heater core 150 may include a valve mounted thereon to block an unnecessary cooling water flow at the side of heater core 150. According to a recent electronic trend, electronic thermostat 210 and electric water pump 110 may be partially adopted.

When seen from automatic transmission 200, the heat management system may include a heat exchanger 210 for warm-up, which is separately mounted therein. Heat exchanger 210 may be inserted into radiator 130 or may use engine cooling water as a heat exchange medium without using the air.

However, in the heat management system in which the engine and the automatic transmission are separately controlled, the temperature control of engine cooling water and the temperature control of automatic transmission fluid (ATF) are not considered together.

Accordingly, the heat management system may not significantly contribute to the control temperature optimization for the engine and the automatic transmission, of which the efficiencies significantly differ depending on the operation temperature.

Therefore, the above-described heat management system which is inadequate to perform the optimal temperature control has a limit in implementing performance required by a vehicle of which the fuel-efficiency is significantly improved and which is operated at high efficiency in accordance with the recent high oil price environment. In particular, the heat management system is inevitably at a disadvantage in terms of the fuel-efficiency improvement which is the most important thing of all.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an integrated heat management system in a vehicle, which is capable of shortening an engine warm-up time at the initial stage of engine start-up, preventing a bad effect in a low-temperature state due to a fast temperature increase of ATF, and optimizing heat management through integrated control for the engine and the automatic transmission, by changing an engine cooling water circulation flow in various manners between an engine and an automatic transmission, depending on an engine driving state, and a heat management method using the same.

Further, various aspects of the present invention are directed to providing an integrated heat management system which is capable of sufficiently satisfying performance required by a vehicle of which the fuel-efficiency is improved and the efficiency is increased in a high oil price environment, by significantly increasing heat management performance through integrated control of an engine and automatic transmission.

In an aspect of the present invention, the integrated heat management system in a vehicle may include an engine system including: a high-temperature cooling water line coming out of an engine and discharging high-temperature cooling water to a radiator; a low-temperature cooling water line coming out of the radiator so as to be linked to the engine and circulating low-temperature cooling water of the radiator through the engine; and a heater core emitting heat by using the high-temperature cooling water; a transmission system including an automatic transmission fluid (ATF) discharge line coming out of an automatic transmission and discharging ATF to a heat exchanger; and an ATF supply line coming out of the heat exchanger so as to be linked to the automatic transmission and circulating the ATF through the automatic transmission; an exhaust heat recovery system using engine heat coming out of the engine; a circulation flow system forming a flow path which connects the engine system and the transmission system; and a control valve having one or more input and output ports which are opened and closed by control of an engine control unit (ECU) receiving vehicle information during engine start-up, and form the flow path of the circulation flow system into a variety of cooling water circulation flow paths.

The exhaust heat recovery system is directly coupled to the engine.

The ECU controls the opening and closing of the control valve by using a temperature of cooling water and a temperature of the ATF.

The circulation flow system comprises: an engine system circulation line which connects the engine and the exhaust heat recovery system and connects the heater core and the engine; and a transmission system circulation line which connects the engine and the exhaust heat recovery system and connects the heat exchanger and the engine, wherein the engine system circulation line and the transmission system circulation line are connected to different input ports and different output ports of the control valve, respectively.

The transmission system circulation line comprises: a high-temperature inflow line which is linked to the exhaust heat recovery system from the engine; a high-temperature connection line which is linked to an input port of the control valve from the exhaust heat recovery system; a heat exchanger supply line which comes out of an output port of the control valve and is linked to the exchanger; and a heat exchanger discharge line which comes out of the heat exchanger and is coupled to the engine.

The high-temperature inflow line is coupled to the high-temperature cooling water line coming out of the engine, and the heat exchanger discharge line is coupled to the low-temperature cooling water line entering the engine.

The engine system circulation line comprises: a low-temperature connection line which is linked to another input port of the control valve from the engine; a bypass line which comes out of another output port of the control valve; a heater core connection line which comes out of another output port of the control valve and is linked to the heater core; and an integrated line which comes out of the heater core so as to be linked to the engine and is coupled to the bypass line.

The low-temperature connection line and the integrated line are coupled to the low-temperature cooling water line entering the engine, a thermostat is positioned between the low-temperature connection line and the integrated line, and the heat exchanger discharge line is positioned between the integrated line and the engine.

In another aspect of the present invention, a heat management method using an integrated heat management system of a vehicle may include checking whether or not a fail exists in a control valve which opens and closes a flow path forming a cooling water circulation flow between an engine and an automatic transmission during key on for engine start-up; detecting cooling water temperature and ATF temperature after the engine start-up, when it is determined that a fail does not exist in the control valve; and dividing an engine operation period after engine cooling water warm-up and ATF warm-up at the initial stage of the engine start-up, after detecting the cooling water temperature and the ATF temperature, wherein the engine operation period is classified into first to seventh mode depending on a condition of the detected cooling water temperature and the detected ATF temperature, and one mode which is the most suitable for the condition is selected and performed.

The checking of whether or not a fail exists in the control valve comprises informing a driver of the fail of the control valve, when it is determined that the fail exists in the control valve.

The method may further include switching the control valve to a safety mode to open all the input and output ports or controlling the opening and closing of the input and output ports to block an increase of the cooling water temperature and an increase of the ATF temperature, when the engine is not started or the cooling water temperature and the ATF temperature are not detected in the detecting of the cooling water temperature and the ATF temperature.

In the dividing of the engine operation period, when a condition of (engine operation time<$a0$ (a time required until the cooling water is completely warmed up)) is satisfied, a first mode is performed, when the condition of (engine operation time<$a0$) is not satisfied and a condition of (heater=off) and a condition of (cooling water temperature<$b0$ (cooling water temperature when the cooling water is completely warmed up)) are satisfied, a second mode is performed, when the condition of (engine operation time<$a0$) is not satisfied, the condition of (heater=off) is satisfied, the condition of (cooling water temperature<$b0$ (cooling water temperature when the cooling water is completely warmed up)) is not satisfied, and a condition of (oil temperature<$c0$ (temperature when the ATF is completely warmed up)) is satisfied, a third mode is performed, when the condition of (engine operation time<$a0$) is not satisfied, the condition of (heater=off) is satisfied, the condition of (cooling water temperature<$b0$ (cooling water temperature when the cooling water is completely warmed up)) is not satisfied, the condition of (oil temperature<$c0$ (temperature when the ATF is completely warmed up)) is not satisfied, and a condition of ($b0$ cooling water temperature<$b1$ (cooling water temperature which is sufficiently increased after warm-up)) and a condition of ($c0$ oil temperature<$c1$ (ATF temperature which is sufficiently increased after warm-up)) are satisfied, a fourth mode is performed, when the condition of (engine operation time<$a0$) is not satisfied, the condition of (heater=off) is satisfied, the condition of (cooling water temperature<$b0$ (cooling water temperature when the cooling water is completely warmed up)) is not satisfied, the condition of (oil temperature<$c0$ (temperature when the ATF is completely warmed up)) is not satisfied, and the condition of ($b0$ cooling water temperature<$b1$ (cooling water temperature which is sufficiently increased after warm-up)) and the condition of ($c0$ oil temperature<$c1$ (ATF temperature which is sufficiently increased after warm-up)) are not satisfied, a fifth mode is performed, when the condition of (engine operation time<$a0$) is not satisfied, a condition of (heater=on) is not satisfied, and the condition of (cooling water<$b0$ (cooling water temperature when the cooling water is completely warmed up)) is satisfied, a sixth mode is performed, when the condition of (engine operation time<$a0$) is not satisfied, the condition of (heater=on) is not satisfied, the condition of (cooling water<$b0$ (cooling water temperature when the cooling water is completely warmed up)) is not satisfied, and the condition of (oil temperature<$c0$ (temperature when the ATF is completely warmed up)) is satisfied, a seventh mode is performed, and when the condition of (engine operation time<$a0$) is not satisfied, the condition of (heater=on) is not satisfied, the condition of (cooling water temperature<$b0$ (cooling water temperature when the cooling water is completely warmed up)) is not satisfied, the condition of (oil temperature<$c0$ (temperature when the ATF is completely warmed up)) is not satisfied, the condition of ($b0$ cooling water temperature<$b1$ (cooling water temperature which is sufficiently increased after warm-up)) and the condition of ($c0$ oil temperature<$c1$ (ATF temperature which is sufficiently increased after warm-up)) are satisfied, the fourth mode is performed, or when the condition of ($b0$ cooling water temperature<$b1$ (cooling water temperature which is sufficiently increased after warm-up)) and the condition of ($c0$ oil temperature<$c1$ (ATF temperature which is sufficiently increased after warm-up)) are not satisfied, the fifth mode is performed.

When the first mode is performed, all the input and output ports of the control valve are closed, an engine cooling water circulation flow circulating through a high-temperature cooling water line and a low-temperature cooling water line which connect the engine and a radiator is not formed, and only an ATF circulation flow circulating through an ATF discharge line and an ATF supply line which connect the automatic transmission and a heat exchanger is formed.

When the second mode is performed, a flow path which basically generates an ATF circulation flow and additionally generates a cooling water bypass circulation flow is formed, wherein the ATF circulation flow is formed to circulate through an ATF discharge line and an ATF supply line which connect the automatic transmission and a heat exchanger; and wherein the cooling water bypass circulation flow is formed by opening a high-temperature input port and a bypass output port among input and output ports of the control valve, the high-temperature input port being coupled to a high-temperature connection line passing through an exhaust heat recovery system to which a high-temperature inflow line coming out of the engine is linked, and the bypass output port being coupled to a bypass line joining an integrated line which is connected to a low-temperature cooling water line entering the engine.

When the third mode is performed, a flow path which basically generates an AFT circulation flow and additionally generates an oil heat exchange circulation flow is formed, wherein the ATF circulation flow is formed to circulate through an ATF discharge line and an ATF supply line which connect the automatic transmission and a heat exchanger, and wherein the oil heat exchange circulation flow is formed by opening a high-temperature input port and a heat exchanger output port among input and output ports of the control valve, the high-temperature input port being coupled to a high-temperature connection line passing through an exhaust heat recovery system to which a high-temperature inflow line coming out of the engine is linked, and the heat exchanger output port being coupled to a heat exchanger supply line linked to a heat exchanger to which a heat exchanger discharge line linked to a low-temperature water line entering the engine is connected.

When the fourth mode is performed, a flow path which basically generates an ATF circulation flow and additionally generates an engine cooling water circulation flow and a heat release circulation flow is formed, wherein the ATF circulation flow is formed to circulate through an ATF discharge line and an ATF supply line which connect the automatic transmission and a heat exchanger, wherein the engine cooling water circulation flow is formed by using a high-temperature cooling water line and a low-temperature cooling water line which connect the engine and a radiator, and wherein the heat release circulation flow is formed by opening a high-temperature input port and a heater core output port among input and output ports of the control valve, the high-temperature input port being coupled to a high-temperature connection line passing through an exhaust heat recovery system to which a high-temperature inflow line coming out of the engine is linked, and the heater core output port being coupled to a heater core connection line which is linked to a heater core so as to join the heat core to an integrated line connected to a low-temperature cooling water line entering the engine.

when the fifth mode is performed, a flow path which basically generates an ATF circulation flow and additionally generates an engine cooling water circulation flow, a heat release circulation flow, and an oil cooling circulation flow is formed, wherein the ATF circulation flow is formed to circulate through an ATF discharge line and an ATF supply line which connect the automatic transmission and a heat exchanger, wherein the engine cooling water circulation flow is formed by using a high-temperature cooling water line and a low-temperature cooling water line which connect the engine and a radiator, wherein the heat release circulation flow is formed by opening a high-temperature input port and a heater core output port among input and output ports of the control valve, the high-temperature input port being coupled to a high-temperature connection line passing through an exhaust heat recovery system to which a high-temperature inflow line coming out of the engine is linked, and the heater core output port being coupled to a heater core connection line which is linked to a heater core so as to join the heat core to an integrated line connected to a low-temperature cooling water line entering the engine, and wherein the oil cooling circulation flow is formed by opening a low-temperature input port and a heat exchanger output port among input and output ports of the control valve, the low-temperature input port being coupled to a low-temperature inflow line coming out of a low-temperature cooling water line, and the heat exchanger output port being coupled to a heat exchanger supply line linked to a heat exchanger to which a heat exchanger discharge line linked to a low-temperature cooling water line entering the engine is connected.

The fifth mode comprises an emergency control mode which is performed by switching the control valve to a safety mode, when the engine is not started or the cooling water temperature and the ATF temperature are not detected in the detecting of the cooling water temperature and the ATF temperature.

When the sixth mode is performed, a flow path which basically generates an ATF circulation flow and additionally generates a heat release circulation flow is formed, wherein the ATF circulation flow is formed to circulate through an ATF discharge line and an ATF supply line which connect the automatic transmission and a heat exchanger, and wherein the heat release circulation flow is formed by opening a high-temperature input port and a heater core output port among input and output ports of the control valve, the high-temperature input port being coupled to a high-temperature connection line passing through an exhaust heat recovery system to which a high-temperature inflow line coming out of the engine is linked, and the heater core output port being coupled to a heater core connection line which is linked to a heater core so as to join the heat core to an integrated line connected to a low-temperature cooling water line entering the engine.

When the seventh mode is performed, a flow path which basically generates an ATF circulation flow and additionally generates an oil heat exchange circulation flow and a heat release circulation flow is formed, wherein the ATF circulation flow is formed to circulate through an ATF discharge line and an ATF supply line which connect the automatic transmission and a heat exchanger, and wherein the oil heat exchange circulation flow is formed by opening a high-temperature input port and a heat exchanger output port among input and output ports of the control valve, the high-temperature input port being coupled to a high-temperature connection line passing through an exhaust heat recovery system to which a high-temperature inflow line coming out of the engine is linked, and the heat exchanger output port being coupled to a heat exchanger supply line linked to a heat exchanger to which a heat exchanger discharge line linked to a low-temperature water line entering the engine is connected, and wherein the heat release circulation flow is formed by opening the high-temperature input port and a heater core output port among input and output ports of the control valve, the high-temperature input port being coupled to the high-temperature connection line passing through the exhaust heat recovery system to which the high-temperature inflow line coming out of the engine is linked, and the heater core output port being coupled to a heater core connection line which is linked to a heater core so as to join the heat core to an integrated line connected to a low-temperature cooling water line entering the engine.

According to the exemplary embodiments of the present invention, the integrated heat management system and the heat management method may shorten the engine warm-up time by using engine heat generated at the initial stage of engine start-up without a loss, shorten the ATF warp-up time by using high-temperature engine cooling water, and optimize the heat management through the integrated control for the engine and the automatic transmission. Therefore, it is possible to significantly increase the fuel-efficiency of a vehicle having the integrated heat management system mounted thereon.

Further, according to the exemplary embodiments of the present invention, the integrated heat management system and the heat management method may prevent a durability reduction through the maximized cooling operation for the engine cooling water and the ATF using the integrated heat management for the engine and the automatic transmission. Through the prevention of the durability reduction, a maintenance cost and $CO_2$ emission may be reduced.

Furthermore, according to the exemplary embodiments of the present invention, as the integrated heat management system is mounted in a vehicle, the fuel-efficiency and the efficiency may be significantly increased in accordance with a high oil price environment. Accordingly, it is possible to develop a vehicle which may achieve further improved fuel-efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
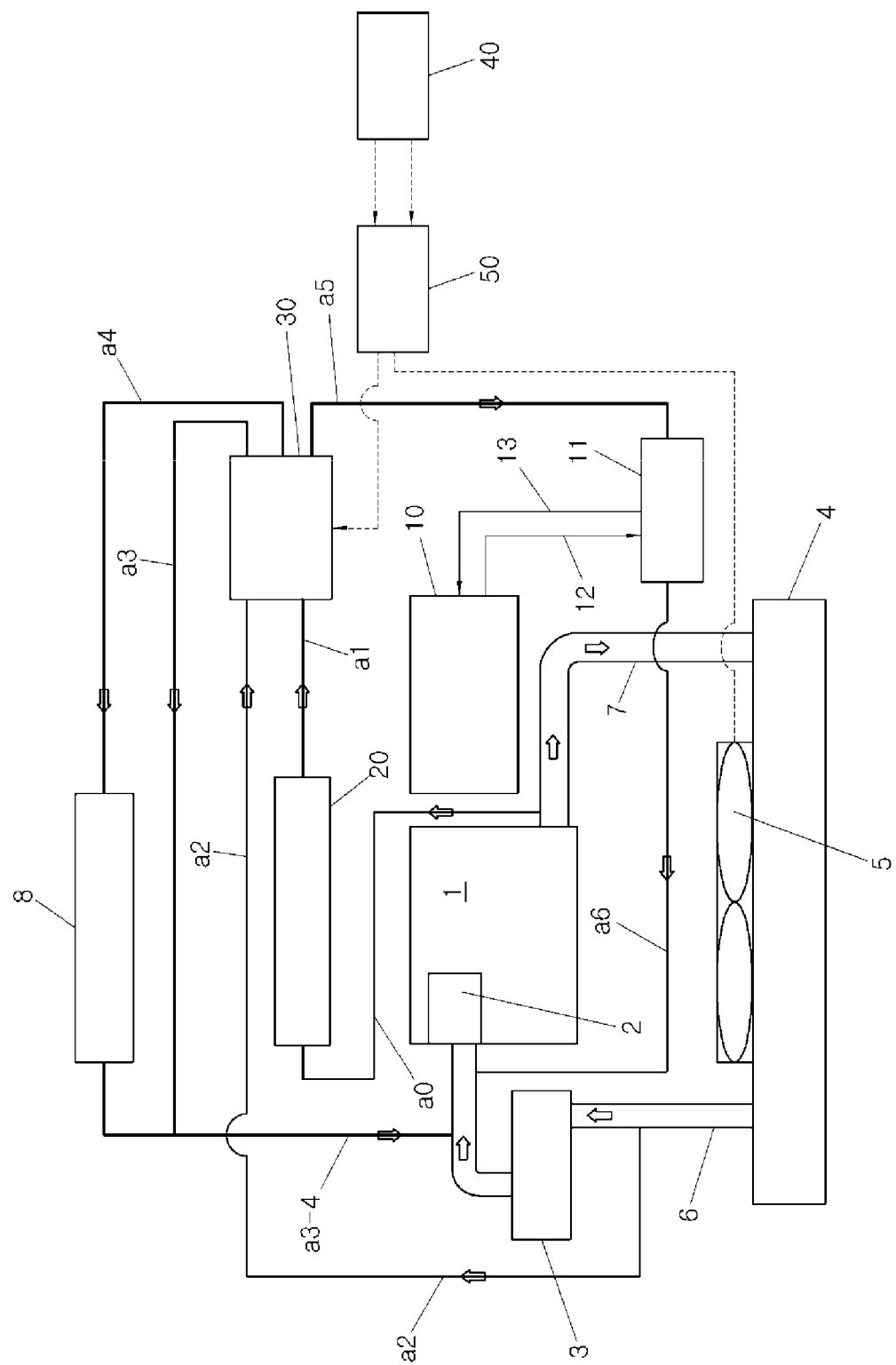
FIG. 1 is a diagram illustrating the structure of an integrated heat management system in a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 illustrates the structure of an integrated heat management system in a vehicle according to an exemplary embodiment of the present invention.

Referring to FIG. 1, the integrated heat management system includes an engine system, a transmission system, an exhaust heat recovery system 20, a circulation flow system, and a control valve 30. The engine system forms an engine cooling water flow around an engine 1. The transmission system forms an automatic transmission fluid (ATF) circulation flow around an automatic transmission 10. Exhaust heat recovery system 20 absorbs engine heat coming out of engine 1. The circulation flow system forms a flow path connecting the engine system and the transmission system. Control valve 30 is opened and closed by control of an engine control unit (ECU) 50 which receives vehicle information through a sensor 40, and forms the flow path of the circulation flow system into a variety of cooling water circulation flow paths.

The engine system includes engine 1, a water pump 2, a thermostat 3, a radiator 4, a cooling fan 5, and a heater core 8. Water pump 2 is driven by the engine 1. Thermostat 3 is installed in a low-temperature cooling water line 6 coming out of the engine 1. Radiator 4 is coupled to a low-temperature cooling water line 6 linked to the engine 1 and coupled to a high-temperature cooling water line 7 coming out of engine 1, in order to circulate cooling water. Cooling fan 5 sends air to the radiator 4. Heater core 8 is coupled to low-temperature cooling water line 6.

Through low-temperature cooling water line 6 and high-temperature cooling water line 7, engine cooling water is circulated.

Transmission system includes an automatic transmission 10 and a heat exchanger 11. An ATF discharge line 12 coming out of automatic transmission 10 is linked to heat exchanger 11, and an ATF supply line 13 is linked in the other way.

Through ATF discharge line 12 and ATF supply line 13, ATF is circulated.

Exhaust heat recovery system 20 recovers heat (engine cooling water or exhaust heat) generated from engine 1, and uses the recovered heat to exchange heat with an actuator passing therethrough, thereby increasing the temperature.

Control valve 30 includes two input ports and three output ports and is turned on/off by ECU 50.

Sensor 40 may include a temperature sensor which detects the temperature of engine cooling water and a temperature sensor which detects the temperature of ATF. The control of ECU 50 may include the on/off control of the control valve 30 and the speed control of cooling fan 5.

Meanwhile, the circulation flow system is divided into a transmission system circulation line and an engine system circulation line. The transmission system circulation line connects engine 1 and exhaust heat recovery system 20 and connects heat exchanger 11 and engine 1. The engine system circulation line connects engine 1 and the exhaust heat recovery system and connects heater core 8 and engine 1.

Control valve 30 is installed in the transmission system circulation line and the engine system circulation line, and ECU 50 controls control valve 30 to block or maintain a flow.

The transmission system circulation line includes a high-temperature inflow line a0, a high-temperature connection line a1, a heat exchanger supply line a5, and a heat exchanger discharge line a6. High-temperature inflow line a0 sends heat generated from engine 1 to exhaust heat recovery system 20. High-temperature connection line a1 is linked to an input port of control valve 30 from exhaust recovery system 20. Heat exchanger supply line a5 comes out of an output port of control valve 30 and is linked to heat exchanger 11. Heat exchanger discharge line a6 comes out of heat exchanger 11 and is coupled to engine 1.

The input port of control valve 30, which is coupled to the high-temperature connection line a1 coming out of exhaust heat recovery system 20, is referred to as a high-temperature input port. The output port of control valve 30, from which heat exchanger supply line a5 linked to heat exchanger 11 is connected, is referred to as a heat exchanger output port.

In the exemplary embodiment, high-temperature inflow line a0 is coupled to high-temperature cooling water line 7 coming out of engine 1, and heat exchanger discharge line a6 is coupled to low-temperature cooling water line 6 entering engine 1.

The engine system circulation line includes a low-temperature connection line a2, a bypass line a3, a heater core connection line a4, and an integrated line a3-4. Low-temperature connection line a2 is linked to another input port of control valve 30 from engine 1. Bypass line a3 comes out of another output port of control valve 30. Heater core connection line a4 comes out of another port of control valve 30 and is coupled to heater core 8. Integrated line a3-4 comes out of heater core 8 so as to be linked to engine 1, and is connected to bypass line a3.

The input port of control valve 30, which is linked to low-temperature connection line a2, is referred to as a low-temperature input port.

The output port of control valve 30, from which bypass line a3 is connected, is referred to as a bypass output port.

The output port of control valve 30, from which heat core connection line a4 linked to heater core 8 is connected, is referred to as a heater core output port.

In the exemplary embodiment, low-temperature connection line a2 and integrated line a3-4 are connected to low-temperature cooling water line 6 entering engine 1, thermostat 3 is positioned between low-temperature connection line a2 and integrated line a3-4, and heat exchanger discharge line a6 is positioned between integrated line a3-4 and engine 1.

Figure 2:
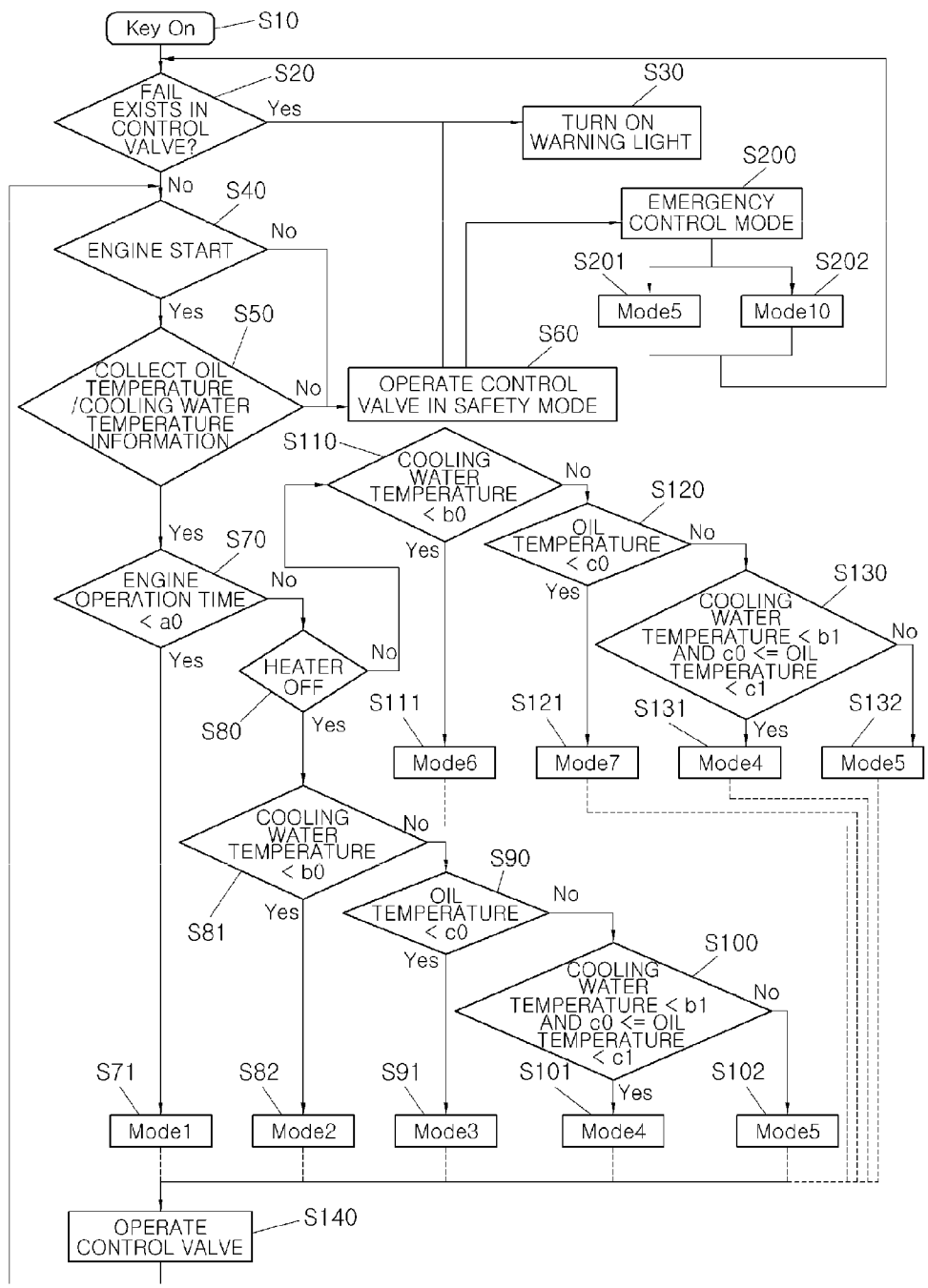
FIG. 2 is a heat management control flow chart using the integrated heat management system in a vehicle according to an exemplary embodiment of the present invention.

FIG. 2 illustrates control logic for controlling the integrated heat management system according to an exemplary embodiment of the present invention.

Referring to FIG. 2, when a key is turned on to start the engine at step S10, whether or not a fail exists in control valve 30 is first checked at step S20. Then, when it is determined that a fail exists in control valve 30, the process proceeds to step S30 in which a warning light is turned on to inform a driver of the fail state.

In this case, when it is determined that a fail does not exist in control valve 30, the engine is started at step S40. After the engine is started, detected oil temperature (ATF temperature) and engine cooling water temperature are analyzed at step S50.

However, when the engine is not started at the step S40 or the oil temperature and the engine cooling water temperature which are necessary information are not obtained or detected, control valve 30 is quickly switched to a safety mode at step S60.

In particular, the safety mode is immediately performed when an interrupt signal is received while the integrated heat management control logic is executed. The interrupt signal is unexpectedly generated when the vehicle is stopped or the engine is stopped.

The safety mode may prevent such a phenomenon that the pressure of cooling water within exhaust heat recovery system 20 increases when the engine is stopped.

The safety mode will be described below in more detail.

When the oil temperature and the engine cooling water temperature which are necessary information are obtained at the step S50, the most optimal mode among a plurality of modes 1 to 7 (steps S70 to S130) is selected to perform the integrated heat management control, according to the measured values of the two temperatures. The plurality of modes 1 to 7 are implemented by dividing an engine operation period after engine cooling water warm-up and ATF warm-up at the initial stage of engine start-up.

Step S140 is an operation step of control valve 30 of which two input ports and three output ports are differently opened and closed by the control of ECU 50, according to each of the modes 1 to 7. Control valve 30 of which the operation has been completed according to each of the modes is maintained in a standby state until the next control.

A mode which is most preferentially considered among the modes 1 to 7 is the mode 1 of step S71. In the mode 1, determination is performed by applying a condition of (engine operation time<a0) at step S70 which is the previous step of the step S71.

Here, a0 represents a time required until the engine is completely warmed up after being started. The condition of (engine operation time<a0) means that the engine cooling water temperature has not increased sufficiently.

Figure 3:
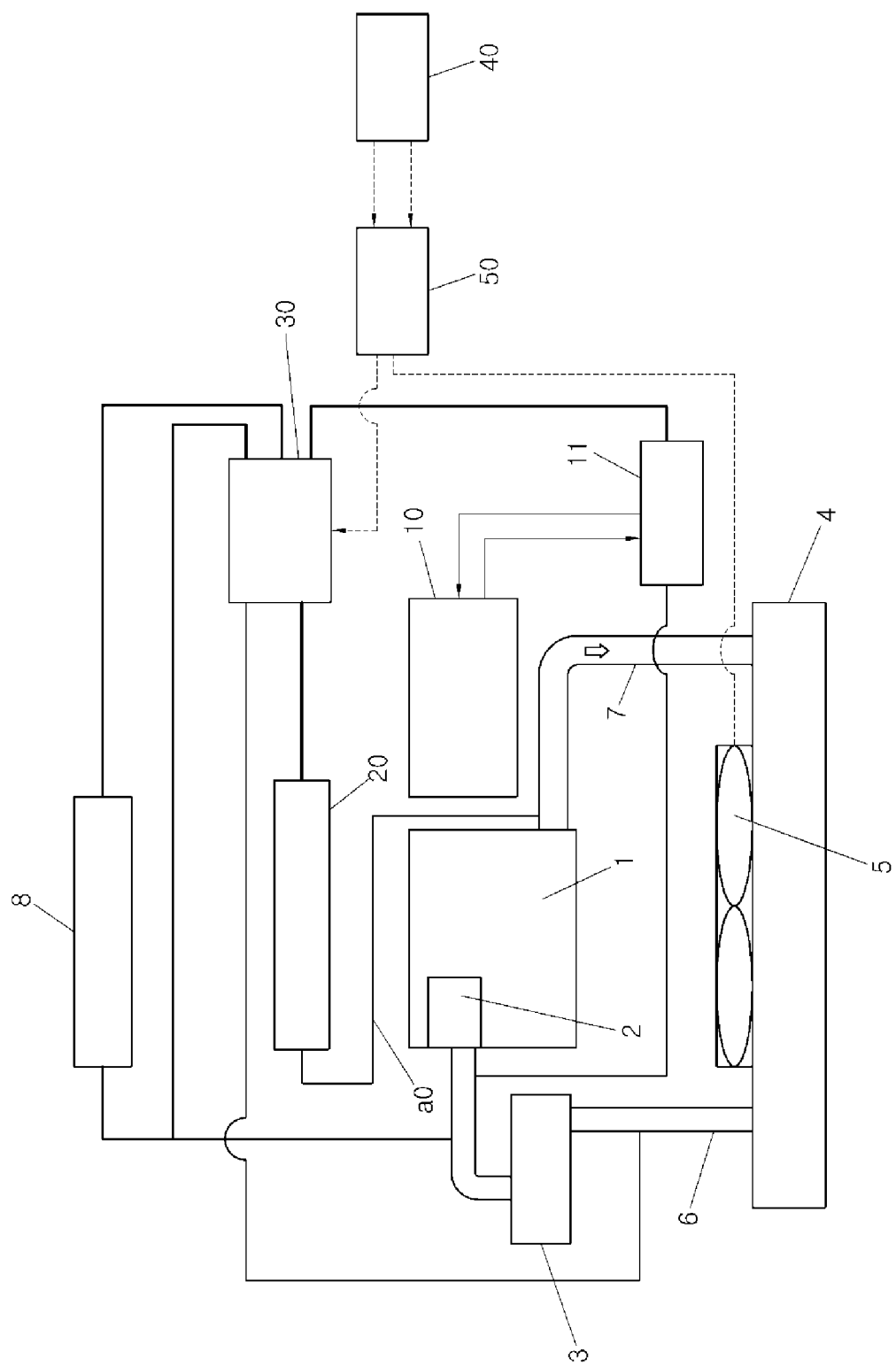
FIGS. 3 to 9 illustrate respective modes which are implemented in the integrated heat management system according to an exemplary embodiment of the present invention.

Therefore, the mode 1 corresponds to a state in which, since all the input ports and output ports of control valve 30 are blocked by the control of ECU 50, the flow path of the integrated heat management system is not formed. FIG. 3 illustrates the integrated heat management system in such a state.

In the mode 1 as illustrated in FIG. 3, all the input ports and output ports of control valve 30 are blocked, and thus a flow path is not formed.

Accordingly, an engine cooling water circulation flow is not formed through high-temperature cooling water line 7 and low-temperature cooling water line 6, which connect engine 1 and radiator 4, but only an ATF circulation flow is formed through AFT discharge line 12 and APT supply line 13 which connect automatic transmission 10 and heat exchanger 11.

Such a control state in which all the ports of control valve 30 are blocked by ECU 50 is maintained until heat recovery is actually performed by exhaust heat recovery system 20.

Therefore, the integrated heat management system in the mode 1 may prevent an unnecessary engine heat loss as much as possible, at the initial stage of the engine start-up. Accordingly, it is possible to shorten a warm-up time.

At step S82, the integrated heat management control is performed according to the mode 2 different from the mode 1. The mode 2 is selected when at least two conditions are established.

At step S80, whether or not a heater is operated is determined in a state in which the condition of (engine operation time<a0) is not satisfied, and mode selection is performed depending on whether the heater is turned on or off.

Step S81 is a mode selection step in which the engine cooling water temperature is considered in a state in which a condition of (heater=off) is satisfied. In this case, a condition of (cooling water temperature<b0) is applied as a mode selection condition.

Here, b0 represents the temperature of the engine cooling water which was not sufficiently warmed up even though a temperature increase was achieved to some extent by engine heat after the engine start-up. The condition of (cooling water temperature<b0) means that the engine cooling water temperature has not increased sufficiently.

Therefore, in the mode 2, ECU 50 opens only some ports among all the input and output ports of control valve 30. Accordingly, referring to FIG. 4, the integrated heat management system forms a flow path at some sections of the entire flow path.

Figure 4:
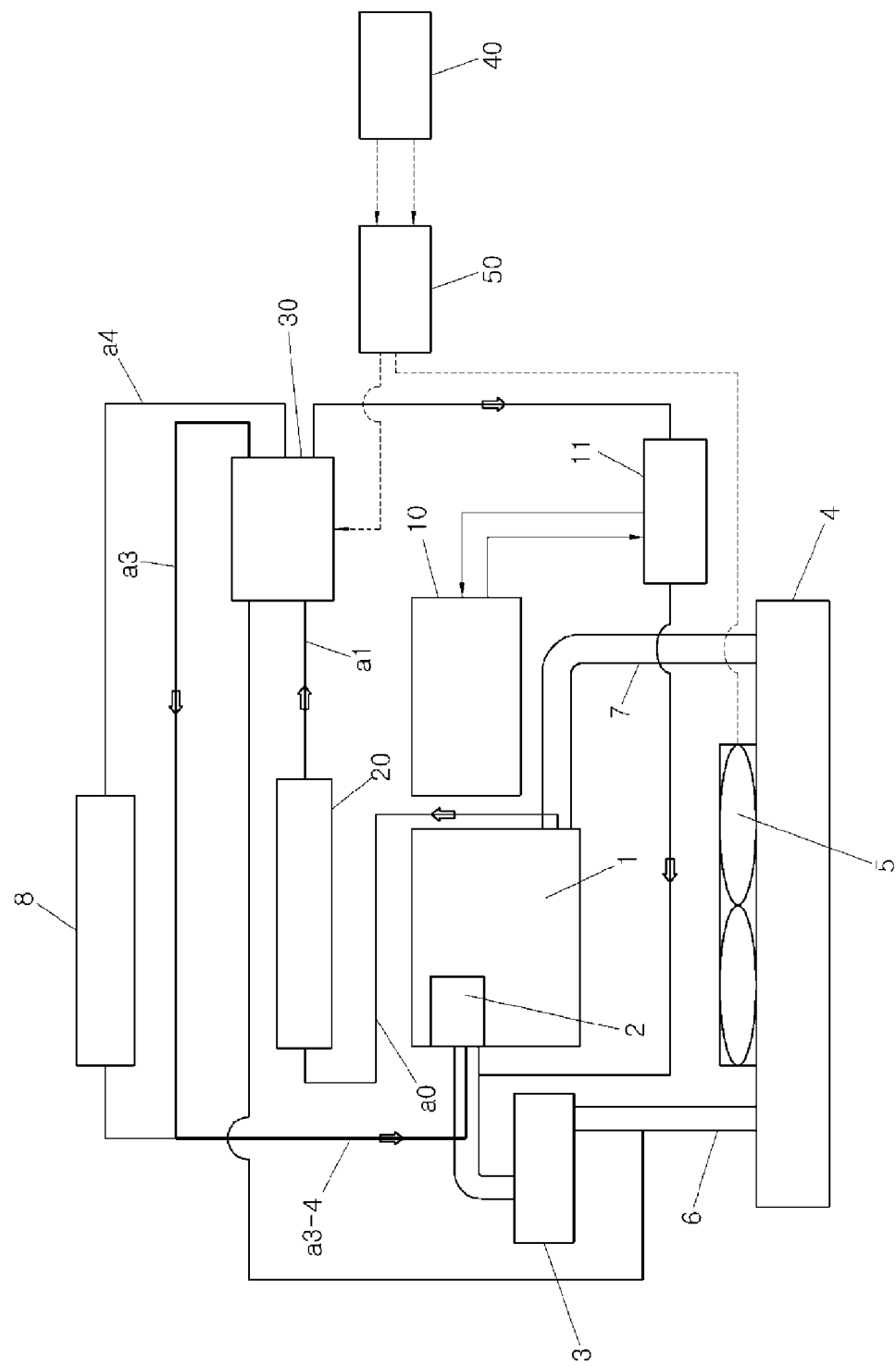

In the mode 2 as illustrated in FIG. 4, one input port of two input ports and one output port of three output ports in control valve 30 are opened. That is, the high-temperature input port and the bypass output port of control valve 30 are opened.

Accordingly, a flow path which basically generates an ATF circulation flow and additionally generates a cooling water bypass circulation flow is formed in the entire flow path of the integrated heat management system.

The cooling water bypass circulation flow is formed by high-temperature inflow line a0 which is linked to exhaust heat recovery system 20 from engine 1, high-temperature connection line a1 which is linked to the input port of control valve 30 from exhaust heat recovery system 20, bypass line a3 which comes out of the output port of control valve 30, and integrated line a3-4 which is joined to bypass line a3 and coupled to low-temperature cooling water line 6 entering engine 1.

In this case, the input port of control valve 30, which is connected to high-temperature connection line a1, and the output port of control valve 30, from which bypass line a3 is connected, are opened by the control of ECU 50.

In the above-described mode 2, the integrated heat management system does not form the engine cooling water circulation flow circulating through engine 1, but forms an ATF circulation flow circulating through automatic transmission 10 and a cooling water bypass circulation flow in which high-temperature engine cooling water coming out of engine 1 passes through exhaust heat recovery system 20 and control valve 30 and then returns to engine 1.

Such a control state in which one input port and one output port among all the ports of control valve 30 are opened is maintained until heat recovery is actually performed by exhaust heat recovery system 20.

After the mode 2 is performed, the engine 1 is completely warmed up.

Therefore, although the mode 2 has a lower level of contribution than the mode 1, the integrated heat management system in the mode 2 may prevent an unnecessary engine heat loss as much as possible after the engine start-up. Accordingly, the mode 2 may contribute to shortening the warm-up time of the engine 1.

At step S90, when the condition of (cooling water temperature<b0) is not satisfied at the step S8 1, an oil temperature condition of AFT is further applied to select the mode 3 different from the modes 1 and 2. In this case, a condition of (oil temperature<c0) is applied.

Here, c0 represents the temperature of ATF, which prevents the automatic transmission 10 from being negatively influenced by ATF in a low-temperature state. The condition of (oil temperature<c0) means that the AFT temperature has not increased sufficiently.

Therefore, in the mode 3 in which the condition of (oil temperature<c0) is satisfied, ECU 50 opens only some ports of all the input and output ports of control valve 30. Accordingly, referring to FIG. 5, the integrated heat management system forms a flow path different from that in the mode 2, at some sections of the entire flow path.

Figure 5:
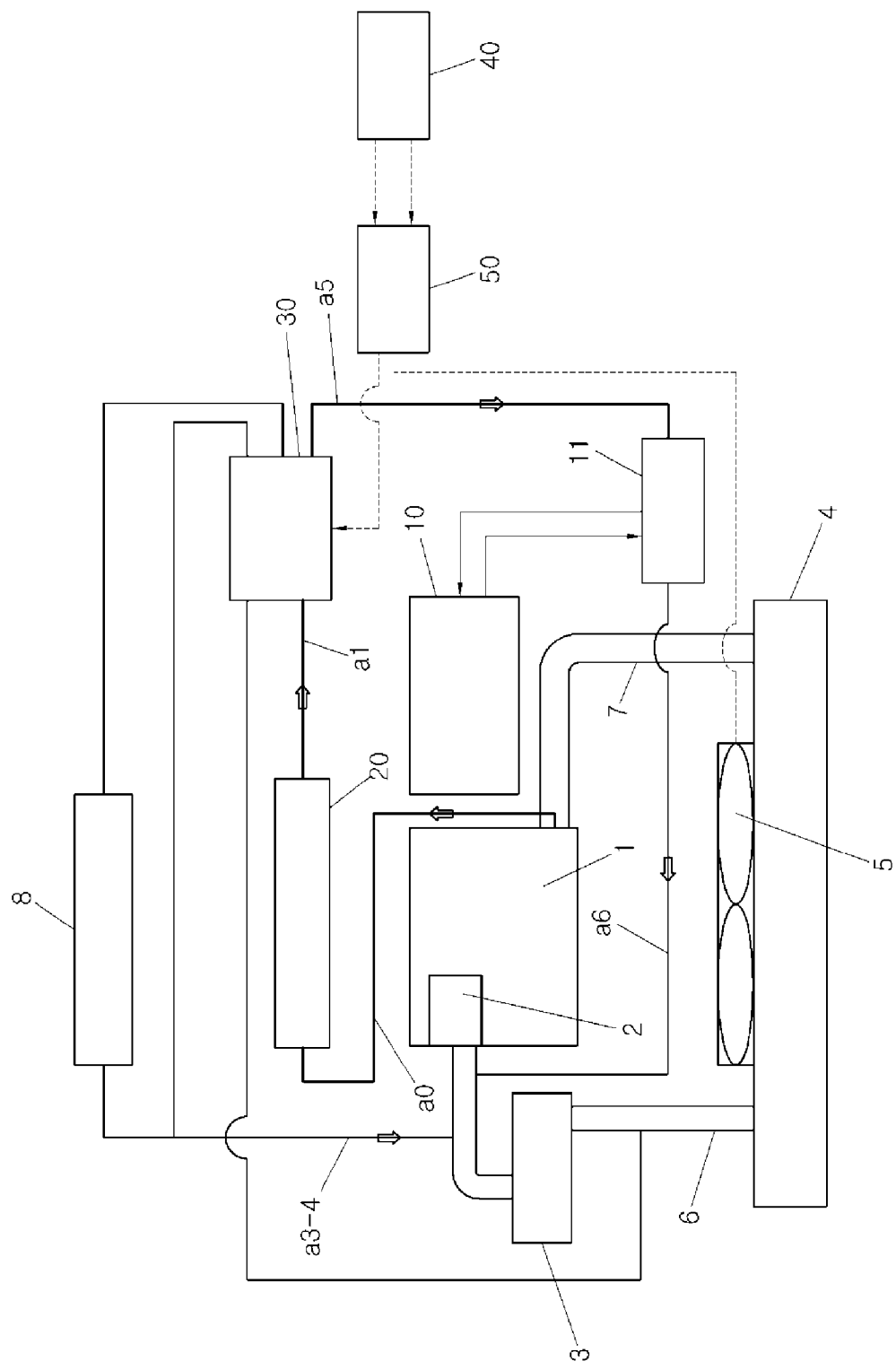

In the mode 3 as illustrated in FIG. 5, one input port of two input ports and one output port of three output ports in control valve 30 are opened. That is, the high-temperature input port and the heat exchanger output port of control valve 30 are opened.

Accordingly, the integrated heat management system forms a flow path which basically generates an ATF circulation flow and additionally generates an oil heat exchange circulation flow, in the entire flow path.

The oil heat exchange circulation flow is formed by high-temperature inflow line a0 which is linked to exhaust heat recovery system 20 from engine 1, the high-temperature connection line a1 which is linked to the input port of control valve 30 from exhaust heat recovery system 20, heat exchanger supply line a5 which comes out of the output port of control valve 30 and is linked to heat exchanger 11, and heat exchanger discharge line a6 which comes out of heat exchanger 11 and is coupled to low-temperature cooling water line 6 linked to engine 1.

In the above-described mode 3, the integrated heat management system does not form the engine cooling water circulation flow circulating through engine 1, but forms the AFT circulation flow circulating through automatic transmission 10 and the oil heat exchange circulation flow in which high-temperature engine cooling water coming out of engine 1 passes through exhaust heat recovery system 20 and control valve 30 via heat exchanger 11 and then returns to engine 1.

Therefore, different from the modes 1 and 2 which are focused on the warm-up operations at the initial stage of the engine start-up and after the engine start-up, respectively, the mode 3 may be focused on the ATF warm-up operation using high-temperature engine cooling water.

Accordingly, the integrated heat management system may quickly increase the warm-up temperature of the ATF.

At step S100, when the condition of (oil temperature<c0) is not satisfied at the step S90, a changed cooling water temperature condition and a changed oil temperature condition are applied to select the mode 4 as another mode. In this case, a condition of (b0 cooling water temperature<b1 & c0 oil temperature<c1) is applied.

Here, b1 represents the temperature of engine cooling water, which has sufficiently increased through a warm-up process for the engine, and c1 represents the temperature of ATF, which has sufficiently increased at such a level as not to require a warm-up operation.

When the condition of (b0 cooling water temperature <b1 & c0 oil temperature<c1) is satisfied at the step S100, the mode 4 is performed at step S101. In the mode 4, some ports among all the input and output ports of control valve 30 are opened by the control of ECU 50.

Figure 6:
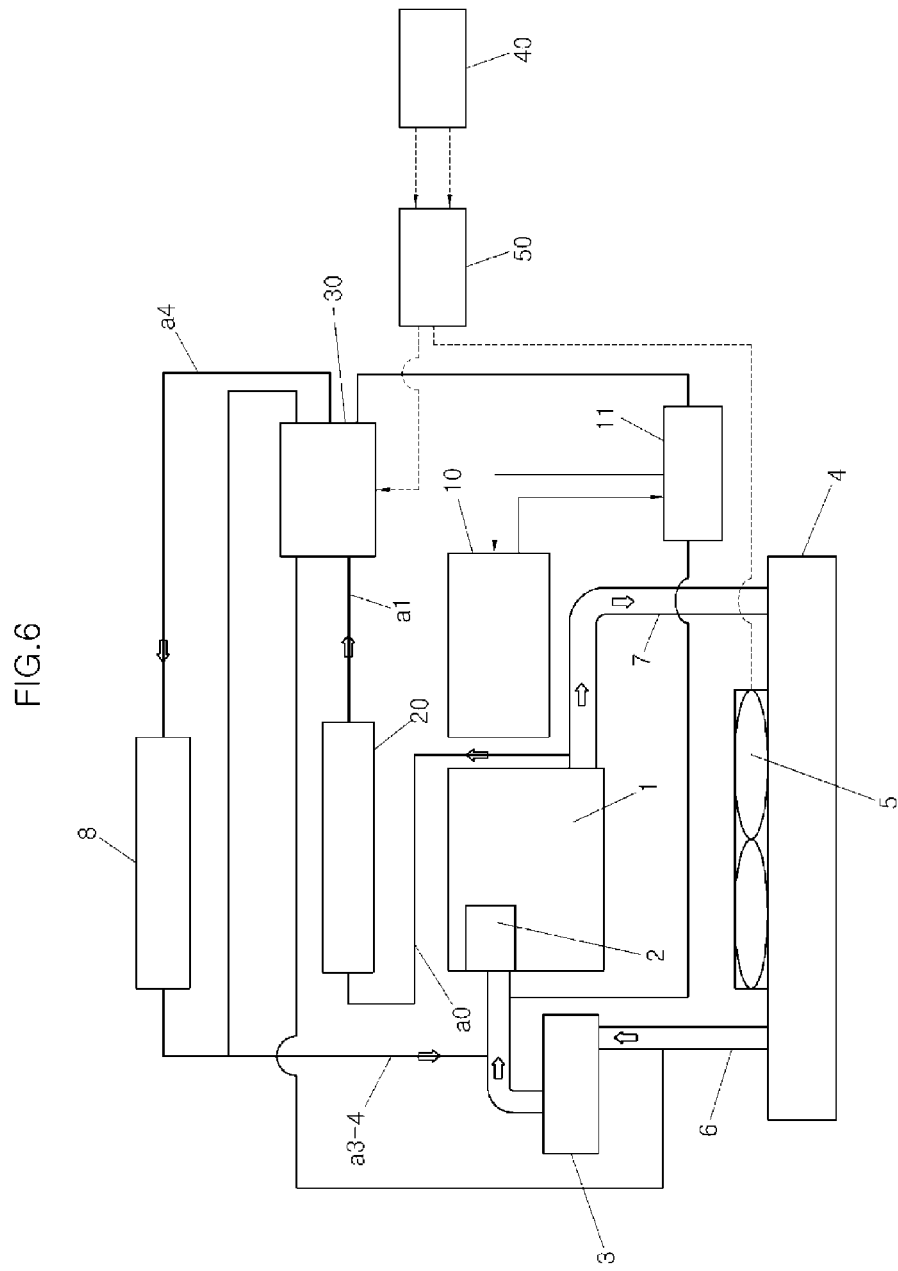

In the mode 4 as illustrated in FIG. 6, one input port of the two input ports and one input port of the three output ports in control valve 30 are opened. That is, the high-temperature input port and the heater-core output port of control valve 30 are opened.

Accordingly, a flow path which basically generates the AFT circulation flow and additionally generates an engine cooling water circulation flow and a heat release circulation flow is formed in the entire flow path of the integrated heat management system.

The engine cooling water circulation flow is formed by high-temperature cooling water line 7 and low-temperature cooling water line 6 which connect engine 1 and radiator 4.

The heat release circulation flow is formed by high-temperature inflow line a0 which is linked to exhaust heat recovery system 20 from engine 1, high-temperature connection line a1 which is linked to the input port of the control valve 30 from exhaust heat recovery system 20, heater core connection line a4 which comes out of the output port of control valve 30 and is linked to heater core 8, and integrated line a3-4 which is coupled to low-temperature cooling water line 6 which is joined to heater core connection line a4 and coupled to low-temperature cooling water line 6 entering engine 1.

In the above-described mode 4, the integrated heat management system basically forms the engine cooling water circulation flow circulating through engine 1 and the ATF circulation flow circulating through the automatic transmission 10, and additionally forms the heat release circulation flow in which high-temperature engine cooling water coming out of engine 1 passes through heater core 8 via exhaust heat recovery system 20 and control valve 30 and then returns to engine 1.

Therefore, different from the modes 1 and 2 focused on the engine warm-up and the mode 3 focused on the AFT warm-up, the mode 4 may be focused on partial engine heat release.

Accordingly, the integrated heat management system may prevent an unnecessary cooling operation for ATF, while performing heat management by using the engine heat release through heater core 8.

However, when the condition of (b0 cooling water temperature<b1 & c0 oil temperature<c1) is not satisfied at the step S100, the mode 5 is performed at step S102. In this case, one condition between the cooling water temperature b1 and the oil temperature c1 is satisfied.

In the mode 5, the two input ports and two output ports of the three output ports in control valve 30 are opened. That is, the high-temperature and low-temperature input ports, the high-temperature output port, and the heater core output port of control valve 30 are opened.

Accordingly, the integrated heat management system forms a flow path which basically generates the ATF circulation flow and additionally generates the engine cooling water circulation flow, the heat release circulation flow, and an oil cooling circulation flow, in the entire flow path.

Figure 7:
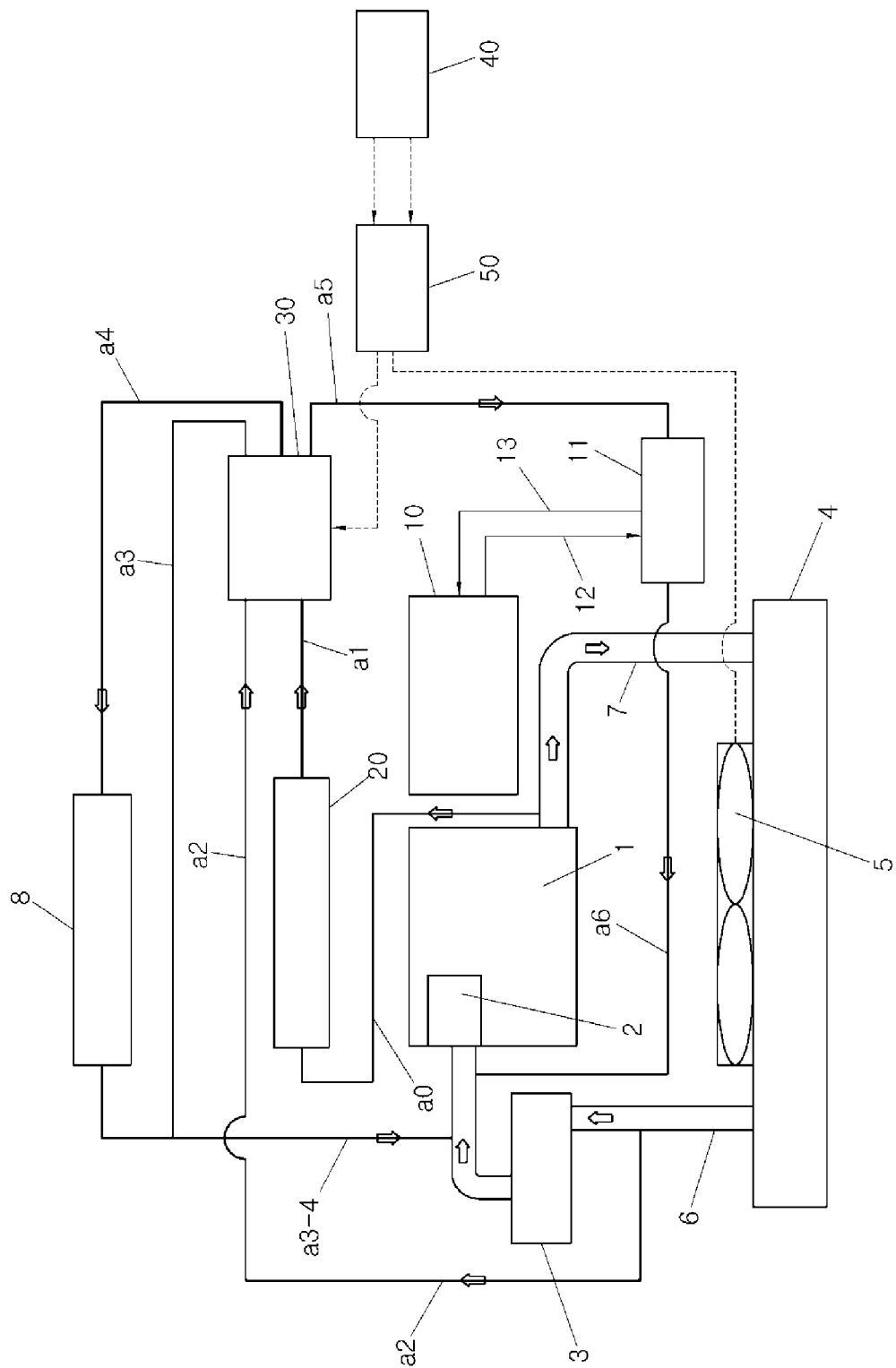

FIG. 7 illustrates the engine cooling water circulation flow, the ATF circulation flow, the heat release circulation flow, and the oil cooling circulation flow, which are formed in the integrated heat management system according to an exemplary embodiment of the present invention.

Referring to FIG. 7, the oil cooling circulation flow is formed by low-temperature inflow line a2 which is linked to an input port of control valve 30 from low-temperature cooling water line 6, heat exchanger supply line a5 which comes out of an output port of control valve 30 and is linked to heat exchanger 11, and heat exchanger discharge line a6 which comes out of heat exchanger 11 and is coupled to low-temperature cooling water line 6 linked to engine 1.

In this case, the heat release circulation flow is formed in the same manner as the flow formed in the above-described mode 4.

In the above-described mode 5, the integrated heat management system basically forms the engine cooling water circulation flow circulating through the engine 1, the ATF circulation flow circulating through automatic transmission 10, and the heat release circulation flow through which heater core 8 releases engine heat, and additionally forms the oil cooling circulation flow in which low-temperature engine cooling water diverging from low-temperature cooling water line 6 lowers the ATF temperature while passing through heat exchanger 11 via control valve 30 and is then discharged to engine 1.

Therefore, different from the modes 1 and 2 focused on the engine warm-up, the mode 3 focused on the ATF warm-up, and the mode 4 focused on the partial engine heat release, the mode 5 may be focused on engine heat release and prevention of ATF temperature decrease.

Accordingly, the integrated heat management system may prevent an unnecessary cooling operation for ATF while performing heat management by using the engine heat release through the heater core 8.

That is, when the mode 5 is performed, the integrated heat management system may simultaneously perform an engine system cooling operation using the heat release of heater core 8 and a transmission system cooling operation using the heat release of heat exchanger 11, which makes it possible to maximize the ATF cooling effect while maintaining durability.

At step S110, when the condition of (heater core 8=0ff) is not satisfied at the step S80, that is, a condition of (heater core 8=on) is satisfied, the engine cooling water temperature is considered to select the mode 6 as another mode.

In this case, the condition of (cooling water temperature<b0) is applied as the mode selection condition. Here, b0 represents the temperature of the engine cooling water which was not sufficiently warmed up even though a temperature increase was achieved to some extent by engine heat after the engine start-up. The condition of (cooling water temperature<b0) means that the engine cooling water temperature has not increased sufficiently.

When the condition of (cooling water temperature<b0) is satisfied at the step S110, the mode 6 is performed at step S111. In the mode 6, one input port of the two input ports and one output port of the three output ports in the control valve 30 are opened. That is, the high-temperature input port and the heater core output port of control valve 30 are opened.

Accordingly, the integrated heat management system forms a flow path which basically generates the AFT circulation flow and additionally generates the heat release circulation flow, in the entire flow path.

In this case, the engine cooling water circulation flow is not formed.

Figure 8:
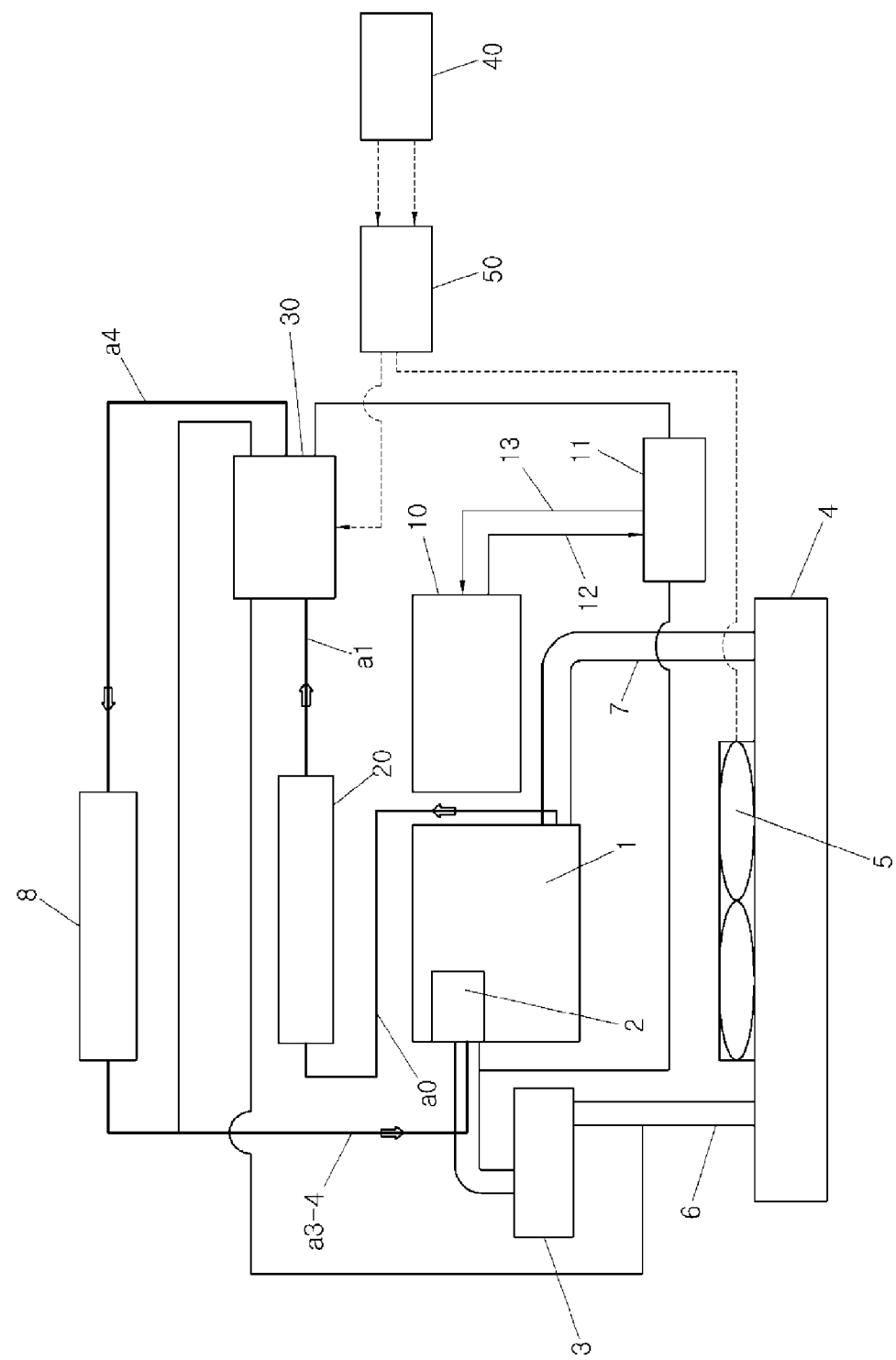

FIG. 8 illustrates the ATF circulation flow and the heat release circulation flow of the integrated heat management system, according to the mode 6.

Referring to FIG. 8, the heat release circulation flow is formed by high-temperature inflow line a0 which is linked to exhaust heat recovery system 20 from engine 1, the high-temperature connection line a1 which is linked to the input port of control valve 30 from exhaust heat recovery system 20, heater core connection line a4 which comes out of the output port of control valve 30 and is linked to heater core 8, and integrated line a3-4 which comes out of heater core 8 so as to be linked to engine 1 and is connected to heater core connection line a4.

In the above-described mode 6, the integrated heat management system does not form the engine cooling water circulation flow circulating through engine 1, but basically forms the ATF circulation flow circulating through automatic transmission 10, and additionally forms a heat release circulation flow in which high-temperature engine cooling water coming out of the engine 1 passes through heater core 8 via the exhaust recovery system 20 and control valve 30 and then returns to engine 1.

Therefore, different from the modes 1 and 2 focused on the engine warm-up, the mode 3 focused on the ATF warm-up, the mode 4 focused on the partial engine heat release, and the mode 5 focused on the ATF cooling operation, the mode 6 may be wholly focused on engine heat release.

Accordingly, the integrated heat management system may maximize the indoor heating effect of the vehicle using exhaust heat recovery system 20.

When the condition of (cooling water temperature<b0) is not satisfied at the step S110, the condition of (oil temperature<c0) is further applied to perform the mode 7 as another mode at step S120.

As described above, c0 represents the temperature of ATF, which prevents automatic transmission 10 from being negatively influenced by ATF in a low-temperature state. The condition of (oil temperature<c0) means that the AFT temperature has not increased sufficiently.

Therefore, in the mode 7 in which the condition of (oil temperature<c0) is satisfied, one input port of the two input ports and two output ports of the three output ports in control valve 30 are opened. That is, the high-temperature input port, the heater core output port, and the heat exchanger output port of control valve 30 are opened.

Accordingly, the integrated heat management system forms a flow path which basically generates the ATF circulation flow and additionally generates the oil heat exchange circulation flow and the heat release circulation flow, in the entire flow path.

In this case, the engine cooling water circulation flow is not formed.

Figure 9:
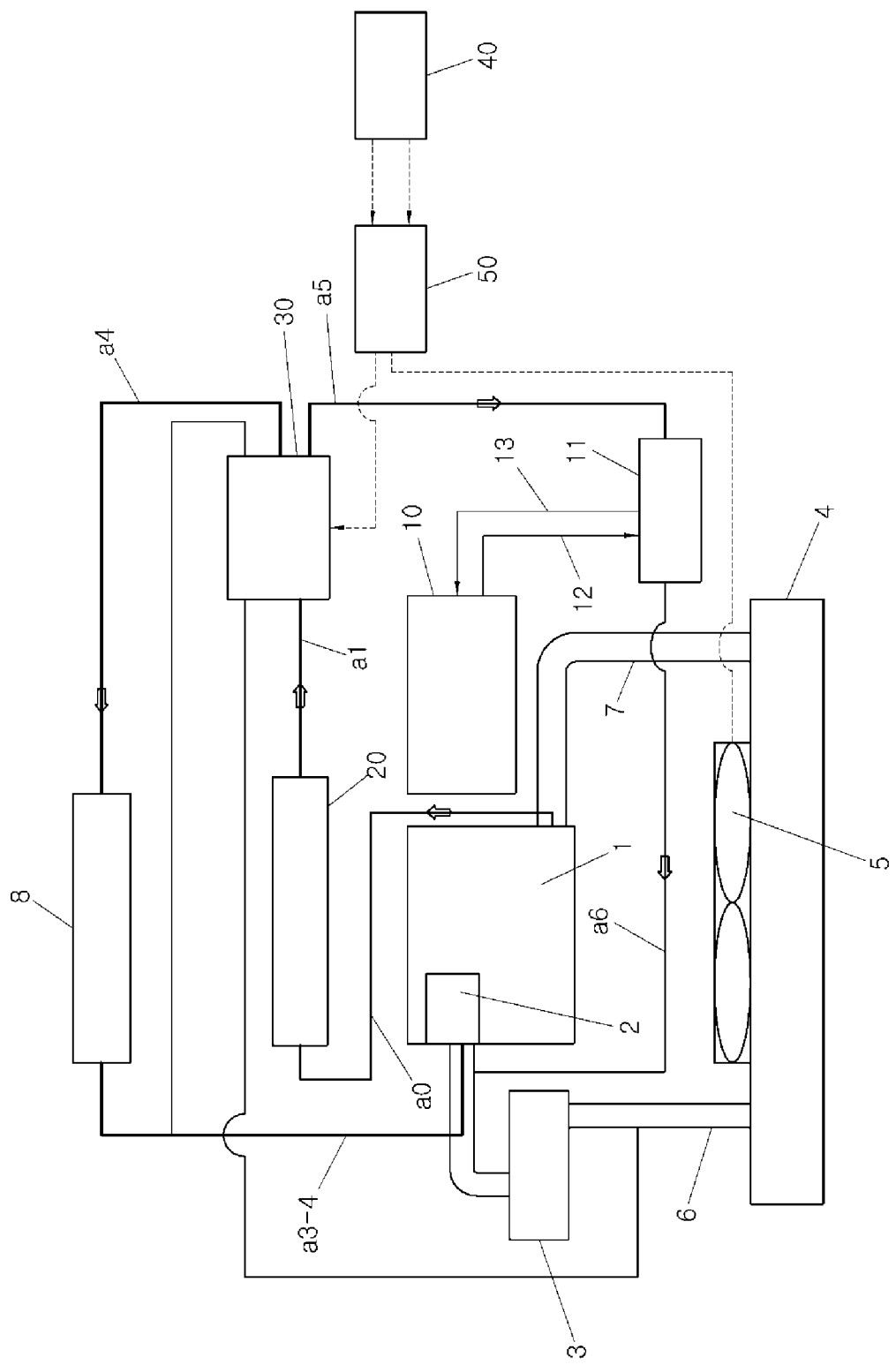
Figure 10:
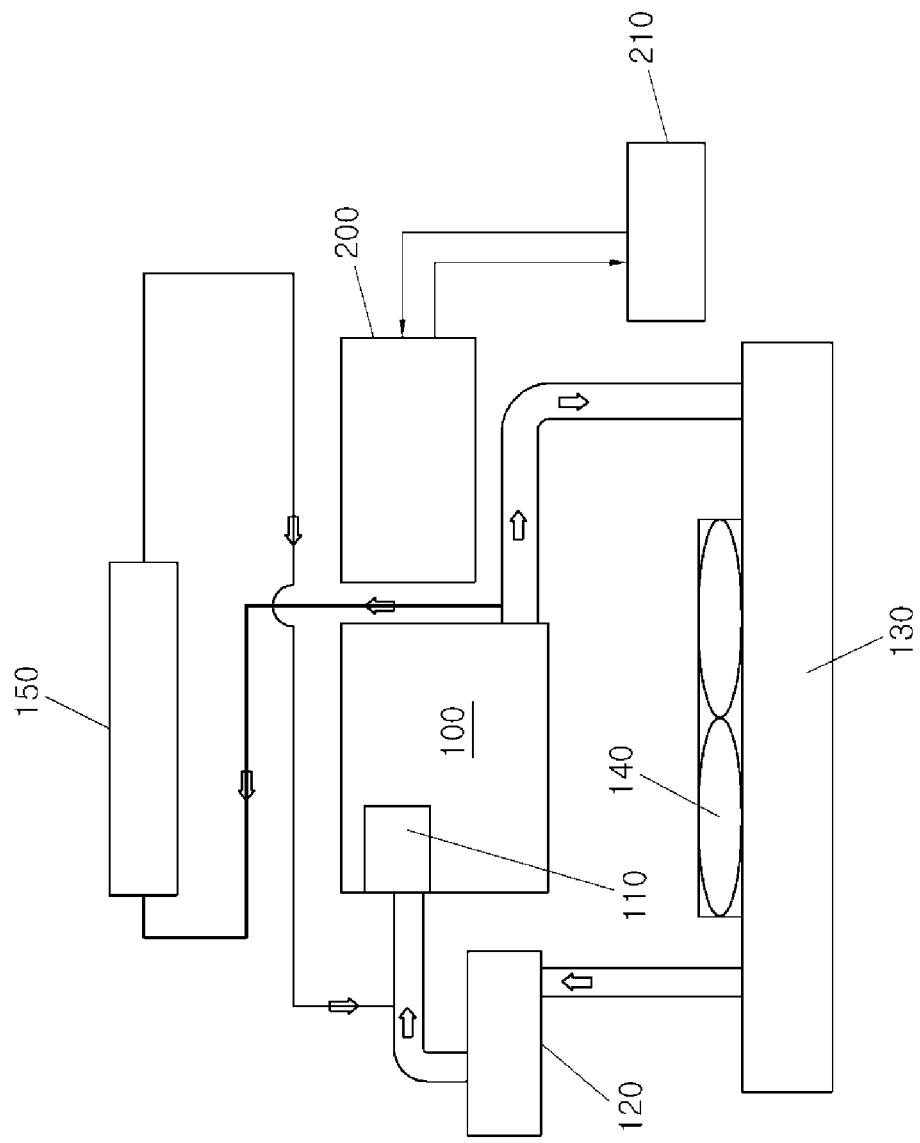
FIG. 10 is a diagram illustrating the structure of a heat management system according to the related art.

FIG. 9 illustrates the AFT circulation flow, the oil heat exchange circulation flow and the heat release circulation flow of the integrated heat management system, according to the mode 7.

Referring to FIG. 9, the oil heat exchange circulation flow is the same flow as that of the above-described mode 3, and the heat release circulation flow is the same flow as that of the above-described modes 4 to 6. Therefore, the detailed descriptions thereof will be omitted.

In the above-described mode 7, the integrated heat management system does not form the engine cooling water circulation flow circulating through engine 1, but basically forms the ATF circulation flow circulating through automatic transmission 10, and additionally forms the oil heat exchange circulation flow in which high-temperature coming out of engine 1 passes through heat exchanger 11 via exhaust heat recovery system 20 and control valve 30 and then returns to engine 1, and the heat release circulation flow in which high-temperature engine cooling water coming out of the engine 1 passes through heater core 8 via exhaust heat recovery system 20 and control valve 30 and then returns to engine 1.

Therefore, different from the modes 1 and 2 focused on the engine warm-up, the mode 3 focused on the ATF warm-up, the mode 4 focused on the partial engine heat release, the mode 5 focused on the ATF cooling operation, and the mode 6 wholly focused on the engine heat release, the mode 7 may be focused on partial engine heat release and an increase of the ATF temperature.

Accordingly, the integrated heat management system may more quickly warm up the ATF and simultaneously maximize the indoor heating effect of the vehicle using exhaust heat recovery system 20.

At step S130, when the condition of (oil temperature<c0) is not satisfied at the step S120, a changed cooling water temperature condition and a changed oil temperature condition are applied to select another mode. In this case, the condition of (b0 cooling water temperature<b1 & c0 oil temperature<c1) is applied.

Here, b1 represents the temperature of engine cooling water, which has sufficiently increased through a warm-up process for the engine, and c1 represents the temperature of ATF, which has sufficiently increased at such a level as not to require a warm-up operation.

When the condition of (b0 cooling water temperature<b1 & c0 oil temperature<c1) is satisfied at the step S130, the mode 4 is performed at step S131.

The mode 4 is performed in the same manner as the mode 4 performed at the step S101. That is, the engine cooling water circulation flow, of which the temperature is increased as engine 1 is completely warmed up, and the ATF circulation flow, of which the temperature is increased as the ATF is completely warmed up, are formed together and the partial engine heat release using the heater core 8 simultaneously occurs.

However, when the condition of (b0 cooling water temperature<b1 & c0 oil temperature<c1) is not satisfied at the step S130, the mode 5 is performed at step S132. In this case, one condition between the cooling water temperature b1 and the oil temperature c1 is satisfied.

The mode 5 is performed in the same manner as the mode 5 performed at the above-described step S102. That is, the oil cooling circulation flow is formed in addition to the engine cooling water circulation flow, the ATF circulation flow, and the heat release circulation flow.

Accordingly, the integrated heat management system may simultaneously perform the engine system cooling operation using the heat release of heater core 8 and the transmission system cooling operation using the heat release of heat exchanger 11, which makes it possible to maximize the ATF cooling effect while maintaining durability.

In the exemplary embodiment, when control valve 30 is switched to the safety mode before the above-described modes 1 to 7 are performed, the warning light is turned on to inform a driver that control valve 30 was switched to the safety mode, through the step S30 as illustrated in FIG. 2. Simultaneously, an emergency control mode is performed at step S200.

The emergency control mode is the integrated heat management control logic performed in the mode 5 at step 201 or integrated heat management control logic performed in a mode 10 at step S202.

When the mode 5 which will be described below in detail is performed, the two input ports and two output ports of the three output ports in control valve 30 are opened. That is, the high-temperature and low-temperature input ports, the high-temperature output port, and the heater core output port of control valve 30 are opened.

Therefore, the integrated heat management system in the mode 5 forms the engine cooling water circulation flow, the ATF circulation flow, the heat release circulation flow, and the oil cooling circulation flow.

Accordingly, the integrated heat management system may simultaneously perform the engine system cooling operation using the heat release of heater core 8 and the transmission system cooling operation using the heat release of heat exchanger 11, which makes it possible to maximize the ATF cooling effect while maintaining durability.

On the other hand, when the mode 10 is performed, the two input ports and the three output ports of control valve 30 are opened. That is, the high-temperature and low-temperature input ports, the high-temperature output port, the heater core output port, and the bypass output port of control valve 30 are opened.

Accordingly, the integrated heat management system may prevent the engine cooling water and the ATF from being overheated, before everything else.

As described above, the integrated heat management system according to the exemplary embodiment of the present invention includes the engine system circulation line around engine 1 and the transmission system circulation line around automatic transmission 10. Furthermore, the engine system circulation line and the transmission system circulation line are integrated into control valve 30 having the plurality of input and output ports. The opening and closing control of control valve 30 based on the engine cooling water temperature and the ATF temperature, which are changed after the engine start-up, may implement a variety of modes (modes 1 to 7) having different engine cooling water flows.

Therefore, when the modes 1 to 7 are implemented by the integrated heat management system according to the respective conditions, the engine warm-up time at the initial stage of the engine start-up may be shortened, and the ATF temperature may be quickly increased. Therefore, it is possible to not only prevent a bad effect in the low-temperature state, but also sufficiently satisfy the performance required by a vehicle of which the fuel-efficiency is improved and the efficiency is increased, in a high oil price environment.

A test has reported that, when heat management control is performed according to the modes 1 to 7 in a vehicle including the integrated heat management system according to the exemplary embodiment of the present invention, a fuel-efficiency improvement effect of about 1.2% or more was obtained under a condition of 25□. In particular, a fuel-efficiency improvement effect of about 3.5% or more was obtained under a low-temperature condition. Furthermore, in the case of ultralow indoor heating performance, performance improvement of 3 degrees was achieved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated heat management system in a vehicle, comprising:
    an engine system including:
        an engine;
        a radiator;
        a low-temperature cooling water line connecting the engine and the Radiator to provide low-temperature cooling water from the radiator to the engine;
        a high-temperature cooling water line connecting the engine and the Radiator to discharge high-temperature cooling water coming out of the engine to the radiator; and
        a heater core coupled to the high-temperature cooling water line;
    a transmission system including:
        an automatic transmission fluid (ATF) discharge line coming out of an automatic transmission and discharging ATF to a heat exchanger; and
        an ATF supply line coming out of the heat exchanger so as to be linked to the automatic transmission and circulating the ATF through the automatic transmission;
    an exhaust heat recovery system connected the engine and using engine heat coming out of the engine;
    a circulation flow system forming a flow path which connects the engine system and the transmission system; and
    a control valve having one or more input and output ports which are opened and closed by control of an engine control unit (ECU) receiving vehicle information during engine start-up, and form the flow path of the circulation flow system into a variety of cooling water circulation flow paths;
    wherein the circulation flow system comprises:
        an engine system circulation line which connects the engine and the exhaust heat recovery system and connects the heater core and the engine; and
        a transmission system circulation line which connects the engine and the exhaust heat recovery system and connects the heat exchanger and the engine; and
    wherein the engine system circulation line and the transmission system circulation line are connected to different input ports and different output ports of the control valve, respectively.

2. The system as defined in claim 1, wherein the exhaust heat recovery system is directly coupled to the engine.

3. The system as defined in claim 1, wherein the ECU controls the opening and closing of the control valve by using a temperature of cooling water and a temperature of the ATF.

4. The system as defined in claim 1, wherein the transmission system circulation line comprises:
    a high-temperature inflow line which is linked to the exhaust heat recovery system from the engine;
    a high-temperature connection line which is linked to an input port of the control valve from the exhaust heat recovery system;
    a heat exchanger supply line which comes out of an output port of the control valve and is linked to the exchanger; and
    a heat exchanger discharge line which comes out of the heat exchanger and is coupled to the engine.

5. The system as defined in claim 4, wherein the high-temperature inflow line is coupled to the high-temperature cooling water line coming out of the engine, and the heat exchanger discharge line is coupled to the low-temperature cooling water line entering the engine.

6. The system as defined in claim 1, wherein the engine system circulation line comprises:
    a low-temperature connection line which is linked to another input port of the control valve from the engine;
    a bypass line which comes out of another output port of the control valve;
    a heater core connection line which comes out of another output port of the control valve and is linked to the heater core; and
    an integrated line which comes out of the heater core so as to be linked to the engine and is coupled to the bypass line.

7. The system as defined in claim 6, wherein the low-temperature connection line and the integrated line are coupled to the low-temperature cooling water line entering the engine, a thermostat is positioned between the low-temperature connection line and the integrated line, and the heat exchanger discharge line is positioned between the integrated line and the engine.

8. A heat management method using an integrated heat management system of a vehicle, the method comprising:
    checking whether or not a fail exists in a control valve which opens and closes a flow path forming a cooling water circulation flow between an engine and an automatic transmission during key on for engine start-up;
    detecting cooling water temperature and ATF temperature after the engine start-up, when it is determined that a fail does not exist in the control valve; and
    dividing an engine operation period after engine cooling water warm-up and ATF warm-up at the initial stage of the engine start-up, after detecting the cooling water temperature and the ATF temperature,
    wherein the engine operation period is classified into first to seventh mode depending on a condition of the detected cooling water temperature and the detected ATF temperature, and one mode which is the most suitable for the condition is selected and performed.

9. The method as defined in claim 8, wherein the checking of whether or not a fail exists in the control valve comprises informing a driver of the fail of the control valve, when it is determined that the fail exists in the control valve.

10. The method as defined in claim 8, further comprising switching the control valve to a safety mode to open all the input and output ports or controlling the opening and closing of the input and output ports to block an increase of the cooling water temperature and an increase of the ATF temperature, when the engine is not started or the cooling water temperature and the ATF temperature are not detected in the detecting of the cooling water temperature and the ATF temperature.

11. The method as defined in claim 8, wherein, in the dividing of the engine operation period, when a condition of (engine operation time<a0 (a time required until the cooling water is completely warmed up)) is satisfied, a first mode is performed, when the condition of (engine operation time<a0) is not satisfied and a condition of (heater=off) and a condition of (cooling water temperature<b0 (cooling water temperature when the cooling water is completely warmed up)) are satisfied, a second mode is performed, when the condition of (engine operation time<a0) is not satisfied, the condition of (heater=off) is satisfied, the condition of (cooling water temperature<b0 (cooling water temperature when the cooling water is completely warmed up)) is not satisfied, and a condition of (oil temperature<c0 (temperature when the ATF is completely warmed up)) is satisfied, a third mode is performed, when the condition of (engine operation time<a0) is not satisfied, the condition of (heater=off) is satisfied, the condition of (cooling water temperature<b0 (cooling water temperature when the cooling water is completely warmed up)) is not satisfied, the condition of (oil temperature<c0 (temperature when the ATF is completely warmed up)) is not satisfied, and a condition of (b0 cooling water temperature<b1 (cooling water temperature which is sufficiently increased after warm-up)) and a condition of (c0 oil temperature<c1 (ATF temperature which is sufficiently increased after warm-up)) are satisfied, a fourth mode is performed, when the condition of (engine operation time<a0) is not satisfied, the condition of (heater=off) is satisfied, the condition of (cooling water temperature<b0 (cooling water temperature when the cooling water is completely warmed up)) is not satisfied, the condition of (oil temperature<c0 (temperature when the ATF is completely warmed up)) is not satisfied, and the condition of (b0 cooling water temperature<b1 (cooling water temperature which is sufficiently increased after warm-up)) and the condition of (c0 oil temperature<c 1 (ATF temperature which is sufficiently increased after warm-up)) are not satisfied, a fifth mode is performed, when the condition of (engine operation time<a0) is not satisfied, a condition of (heater=on) is not satisfied, and the condition of (cooling water<b0 (cooling water temperature when the cooling water is completely warmed up)) is satisfied, a sixth mode is performed, when the condition of (engine operation time<a0) is not satisfied, the condition of (heater=on) is not satisfied, the condition of (cooling water<b0 (cooling water temperature when the cooling water is completely warmed up)) is not satisfied, and the condition of (oil temperature<c0 (temperature when the ATF is completely warmed up)) is satisfied, a seventh mode is performed, and when the condition of (engine operation time<a0) is not satisfied, the condition of (heater=on) is not satisfied, the condition of (cooling water temperature<b0 (cooling water temperature when the cooling water is completely warmed up)) is not satisfied, the condition of (oil temperature<c0 (temperature when the ATF is completely warmed up)) is not satisfied, the condition of (b0 cooling water temperature<b1 (cooling water temperature which is sufficiently increased after warm-up)) and the condition of (C0 oil temperature<c1 (ATF temperature which is sufficiently increased after warm-up)) are satisfied, the fourth mode is performed, or when the condition of (b0 cooling water temperature<b1 (cooling water temperature which is sufficiently increased after warm-up)) and the condition of (c0 oil temperature<c1 (ATF temperature which is sufficiently increased after warm-up)) are not satisfied, the fifth mode is performed.

12. The method as defined in claim 11, wherein, when the first mode is performed, all the input and output ports of the control valve are closed, an engine cooling water circulation flow circulating through a high-temperature cooling water line and a low-temperature cooling water line which connect the engine and a radiator is not formed, and only an ATF circulation flow circulating through an ATF discharge line and an ATF supply line which connect the automatic transmission and a heat exchanger is formed.

13. The method as defined in claim 11, wherein, when the second mode is performed, a flow path which basically generates an ATF circulation flow and additionally generates a cooling water bypass circulation flow is formed, wherein the ATF circulation flow is formed to circulate through an ATF discharge line and an ATF supply line which connect the automatic transmission and a heat exchanger; and wherein the cooling water bypass circulation flow is formed by opening a high-temperature input port and a bypass output port among input and output ports of the control valve, the high-temperature input port being coupled to a high-temperature connection line passing through an exhaust heat recovery system to which a high-temperature inflow line coming out of the engine is linked, and the bypass output port being coupled to a bypass line joining an integrated line which is connected to a low-temperature cooling water line entering the engine.

14. The method as defined in claim 11, wherein, when the third mode is performed, a flow path which basically generates an AFT circulation flow and additionally generates an oil heat exchange circulation flow is formed, wherein the ATF circulation flow is formed to circulate through an ATF discharge line and an ATF supply line which connect the automatic transmission and a heat exchanger, and wherein the oil heat exchange circulation flow is formed by opening a high-temperature input port and a heat exchanger output port among input and output ports of the control valve, the high-temperature input port being coupled to a high-temperature connection line passing through an exhaust heat recovery system to which a high-temperature inflow line coming out of the engine is linked, and the heat exchanger output port being coupled to a heat exchanger supply line linked to a heat exchanger to which a heat exchanger discharge line linked to a low-temperature water line entering the engine is connected.

15. The method as defined in claim 11, wherein, when the fourth mode is performed, a flow path which basically generates an ATF circulation flow and additionally generates an engine cooling water circulation flow and a heat release circulation flow is formed, wherein the ATF circulation flow is formed to circulate through an ATF discharge line and an ATF supply line which connect the automatic transmission and a heat exchanger, wherein the engine cooling water circulation flow is formed by using a high-temperature cooling water line and a low-temperature cooling water line which connect the engine and a radiator, and wherein the heat release circulation flow is formed by opening a high-temperature input port and a heater core output port among input and output ports of the control valve, the high-temperature input port being coupled to a high-temperature connection line passing through an exhaust heat recovery system to which a high-temperature inflow line coming out of the engine is linked, and the heater core output port being coupled to a heater core connection line which is linked to a heater core so as to join the heat core to an integrated line connected to a low-temperature cooling water line entering the engine.

16. The method as defined in claim 11, wherein, when the fifth mode is performed, a flow path which basically generates an ATF circulation flow and additionally generates an engine cooling water circulation flow, a heat release circulation flow, and an oil cooling circulation flow is formed, wherein the ATF circulation flow is formed to circulate through an ATF discharge line and an ATF supply line which connect the automatic transmission and a heat exchanger, wherein the engine cooling water circulation flow is formed by using a high-temperature cooling water line and a low-temperature cooling water line which connect the engine and a radiator, wherein the heat release circulation flow is formed by opening a high-temperature input port and a heater core output port among input and output ports of the control valve, the high-temperature input port being coupled to a high-temperature connection line passing through an exhaust heat recovery system to which a high-temperature inflow line coming out of the engine is linked, and the heater core output port being coupled to a heater core connection line which is linked to a heater core so as to join the heat core to an integrated line connected to a low-temperature cooling water line entering the engine, and wherein the oil cooling circulation flow is formed by opening a low-temperature input and a heat exchanger output port among input and output ports of the control valve, the low-port temperature input port being coupled to a low-temperature inflow line coming out of a low-temperature cooling water line, and the heat exchanger output port being coupled to a heat exchanger supply line linked to a heat exchanger to which a heat exchanger discharge line linked to a low-temperature cooling water line entering the engine is connected.

17. The method as defined in claim 16, wherein the fifth mode comprises an emergency control mode which is performed by switching the control valve to a safety mode, when the engine is not started or the cooling water temperature and the ATF temperature are not detected in the detecting of the cooling water temperature and the ATF temperature.

18. The method as defined in claim 11, wherein, when the sixth mode is performed, a flow path which basically generates an ATF circulation flow and additionally generates a heat release circulation flow is formed, wherein the ATF circulation flow is formed to circulate through an ATF discharge line and an ATF supply line which connect the automatic transmission and a heat exchanger, and wherein the heat release circulation flow is formed by opening a high-temperature input port and a heater core output port among input and output ports of the control valve, the high-temperature input port being coupled to a high-temperature connection line passing through an exhaust heat recovery system to which a high-temperature inflow line coming out of the engine is linked, and the heater core output port being coupled to a heater core connection line which is linked to a heater core so as to join the heat core to an integrated line connected to a low-temperature cooling water line entering the engine.

19. The method as defined in claim 11, wherein, when the seventh mode is performed, a flow path which basically generates an ATF circulation flow and additionally generates an oil heat exchange circulation flow and a heat release circulation flow is formed, wherein the ATF circulation flow is formed to circulate through an ATF discharge line and an ATF supply line which connect the automatic transmission and a heat exchanger, and wherein the oil heat exchange circulation flow is formed by opening a high-temperature input port and a heat exchanger output port among input and output ports of the control valve, the high-temperature input port being coupled to a high-temperature connection line passing through an exhaust heat recovery system to which a high-temperature inflow line coming out of the engine is linked, and the heat exchanger output port being coupled to a heat exchanger supply line linked to a heat exchanger to which a heat exchanger discharge line linked to a low-temperature water line entering the engine is connected, and wherein the heat release circulation flow is formed by opening the high-temperature input port and a heater core output port among input and output ports of the control valve, the high-temperature input port being coupled to the high-temperature connection line passing through the exhaust heat recovery system to which the high-temperature inflow line coming out of the engine is linked, and the heater core output port being coupled to a heater core connection line which is linked to a heater core so as to join the heat core to an integrated line connected to a low-temperature cooling water line entering the engine.

* * * * *